(12) United States Patent
Windauer (10) Patent No.: US 9,665,120 B2
(45) Date of Patent: *May 30, 2017

(54) LOCKING ADJUSTMENT KNOB

(71) Applicant: Leupold & Stevens, Inc., Beaverton, OR (US)

(72) Inventor: Bernard T. Windauer, Kalispell, MT (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,319

(22) Filed: Mar. 21, 2016

(65) Prior Publication Data

US 2016/0274619 A1 Sep. 22, 2016

Related U.S. Application Data

(63) Continuation of application No. 13/975,218, filed on Aug. 23, 2013, now Pat. No. 9,292,034, which is a
(Continued)

(51) Int. Cl.
*F41G 1/38* (2006.01)
*G05G 5/12* (2006.01)
(Continued)

(52) U.S. Cl.
CPC ............... *G05G 5/12* (2013.01); *F41G 1/38* (2013.01); *F41G 1/40* (2013.01); *F41G 3/06* (2013.01);
(Continued)

(58) Field of Classification Search
CPC ........ F41G 1/38; Y10T 74/2084; G02B 23/14
(Continued)

(56) References Cited

U.S. PATENT DOCUMENTS 680,442 A * 8/1901 Schmitt ................. B21D 17/04
72/105
1,344,973 A * 6/1920 Bader ....................... F41G 1/08
42/137
(Continued)

FOREIGN PATENT DOCUMENTS

CN 2752794 Y 1/2006
DE 2 148 967 4/1973
(Continued)

OTHER PUBLICATIONS

Article: *Bayonet Mount*, Answers.com Encyclodictionalmanacapedia, http://www.answers.com/topic/bayonet-mount, visited Sep. 28, 2006, 2 pages.
(Continued)

*Primary Examiner* — Michael David
(74) *Attorney, Agent, or Firm* — Stoel Rives LLP (57) ABSTRACT

An adjustment apparatus for adjusting a setting of a sighting device, such as a riflescope or telescope, includes an adjustment knob operatively coupled to an adjustment mechanism, where rotation of the adjustment knob about a rotational axis drives the adjustment mechanism to adjust the setting of the sighting device. The adjustment apparatus further includes a lock mechanism including a first lock element fixed relative to the sighting device and a second lock element selectively movable relative to the first lock element. When the lock elements engage one another, the adjustment knob is in a locked position and restrained from rotating about the rotational axis. The adjustment apparatus may further include a lock-release mechanism operable to disengage the lock elements and allow the adjustment knob to rotate about the rotational axis.

24 Claims, 10 Drawing Sheets

Related U.S. Application Data continuation of application No. 13/220,525, filed on Aug. 29, 2011, now Pat. No. 8,516,736, which is a continuation of application No. 11/720,428, filed as application No. PCT/US2005/043336 on Nov. 30, 2005, now Pat. No. 8,006,429.

(60) Provisional application No. 60/638,561, filed on Dec. 22, 2004, provisional application No. 60/632,331, filed on Nov. 30, 2004.

(51) Int. Cl.
  *F41G 1/40* (2006.01)
  *F41G 3/06* (2006.01)
  *F41G 3/08* (2006.01)
  *G05G 1/10* (2006.01)
  *G02B 23/14* (2006.01)

(52) U.S. Cl.
  CPC ............... *F41G 3/08* (2013.01); *G05G 1/10* (2013.01); *G02B 23/14* (2013.01); *Y10T 29/49826* (2015.01); *Y10T 74/1494* (2015.01); *Y10T 74/2084* (2015.01)

(58) Field of Classification Search
  USPC ...... 42/119, 120, 122, 124, 136, 138; 74/553
  See application file for complete search history.

(56) References Cited

U.S. PATENT DOCUMENTS

| | | | | |
|---|---|---|---|---|
| 2,143,167 | A * | 1/1939 | Pechar | F41G 11/003 42/126 |
| 2,165,796 | A * | 7/1939 | Humeston | F41G 11/001 42/126 |
| 2,208,913 | A * | 7/1940 | Unertl | F41G 11/002 42/126 |
| 2,229,637 | A * | 1/1941 | Burton | F41G 1/24 42/137 |
| 2,336,107 | A * | 12/1943 | Litschert | F41G 11/002 116/67 R |
| 2,452,592 | A * | 11/1948 | Meyer | F41G 1/38 33/298 |
| 2,583,042 | A * | 1/1952 | Dayton | F41G 1/38 42/122 |
| 2,585,933 | A * | 2/1952 | Harvey | F41G 1/17 42/137 |
| 2,682,707 | A * | 7/1954 | Dahlberg | F41G 1/08 42/137 |
| 2,913,826 | A * | 11/1959 | Petty | F41G 1/38 33/30.7 |
| 3,037,287 | A * | 6/1962 | Glatz | F41G 1/30 74/10.85 |
| 3,058,391 | A * | 10/1962 | Leupold | G02B 15/04 359/422 |
| 3,161,716 | A * | 12/1964 | Burris | G02B 23/145 356/247 |
| 3,222,987 | A * | 12/1965 | Wrigglesworth | G02B 23/14 359/427 |
| 3,280,463 | A * | 10/1966 | Stadler | F41G 1/38 42/122 |
| 3,297,389 | A * | 1/1967 | Gibson | G02B 23/14 359/424 |
| 3,471,932 | A * | 10/1969 | Luning | F41G 11/001 42/126 |
| 3,662,618 | A | 5/1972 | Kroll et al. | |
| 3,707,204 | A | 12/1972 | Dussardier | |
| 3,826,012 | A | 7/1974 | Pachmayr | |
| 3,916,721 | A | 11/1975 | Egger | |
| 3,990,155 | A | 11/1976 | Akin, Jr. et al. | |
| 3,999,442 | A | 12/1976 | Decker et al. | |
| 4,012,966 | A | 3/1977 | Lieberman et al. | |
| 4,026,397 | A | 5/1977 | Raus | |
| 4,038,757 | A | 8/1977 | Hicks et al. | |
| 4,132,129 | A | 1/1979 | Pratt | |
| 4,154,125 | A | 5/1979 | Frank | |
| 4,200,355 | A | 4/1980 | Williams, Jr. | |
| 4,201,096 | A | 5/1980 | Morrison et al. | |
| 4,247,161 | A | 1/1981 | Unertl, Jr. | |
| 4,347,758 | A | 9/1982 | Geil et al. | |
| 4,373,269 | A | 2/1983 | Doliber et al. | |
| 4,389,791 | A | 6/1983 | Ackerman | |
| 4,408,842 | A | 10/1983 | Gibson | |
| 4,457,076 | A | 7/1984 | Heck | |
| 4,461,330 | A | 7/1984 | Judkins | |
| 4,643,542 | A | 2/1987 | Gibson | |
| 4,779,305 | A | 10/1988 | Gorsek | |
| 4,955,253 | A | 9/1990 | Sakai et al. | |
| 4,982,502 | A | 1/1991 | Weyrauch | |
| 5,020,389 | A | 6/1991 | Sigler | |
| 5,083,477 | A | 1/1992 | Geil | |
| 5,121,653 | A | 6/1992 | Sigler | |
| 5,152,187 | A | 10/1992 | LaFemina | |
| 5,329,829 | A | 7/1994 | Sell | |
| 5,363,559 | A | 11/1994 | McCarty | |
| 5,433,010 | A | 7/1995 | Bell | |
| 5,499,456 | A | 3/1996 | Tomita | |
| 5,513,440 | A | 5/1996 | Murg | |
| 5,586,569 | A | 12/1996 | Hanning et al. | |
| 5,615,487 | A | 4/1997 | Tomita | |
| 5,618,374 | A | 4/1997 | Byerley | |
| 5,695,125 | A | 12/1997 | Kumar | |
| 5,696,125 | A * | 12/1997 | Altura | A61K 31/137 514/270 |
| 5,715,607 | A | 2/1998 | Murg | |
| 5,745,287 | A | 4/1998 | Sauter | |
| 5,771,595 | A | 6/1998 | Bell | |
| 5,862,715 | A | 1/1999 | Lemire | |
| 5,892,617 | A | 4/1999 | Wallace | |
| 5,906,141 | A | 5/1999 | Abdelmoula | |
| 5,930,934 | A | 8/1999 | Fisher et al. | |
| 6,005,711 | A | 12/1999 | Mai et al. | |
| 6,279,259 | B1 | 8/2001 | Otteman | |
| 6,351,907 | B1 | 3/2002 | Otteman | |
| 6,442,854 | B1 | 9/2002 | Liu et al. | |
| 6,508,144 | B1 | 1/2003 | Vendetti et al. | |
| 6,519,890 | B1 | 2/2003 | Otteman | |
| 6,588,125 | B2 | 7/2003 | Proctor, Sr. | |
| 6,643,970 | B2 | 11/2003 | Huber | |
| 6,691,447 | B1 | 2/2004 | Otteman | |
| 6,705,037 | B2 | 3/2004 | Van Kirk | |
| 6,721,095 | B2 * | 4/2004 | Huber | G02B 27/34 359/425 |
| 6,772,550 | B1 | 8/2004 | Leatherwood | |
| 6,848,628 | B2 | 2/2005 | Walker | |
| 6,860,442 | B2 | 3/2005 | Datcuk, Jr. | |
| 6,862,832 | B2 | 3/2005 | Barrett | |
| 7,117,624 | B2 | 10/2006 | Kim | |
| 7,121,037 | B2 | 10/2006 | Penney | |
| 7,330,310 | B2 | 2/2008 | Hengst et al. | |
| 7,495,847 | B2 | 2/2009 | Thomas | |
| 7,934,335 | B2 | 5/2011 | Halverson | |
| 8,006,429 | B2 | 8/2011 | Windauer | |
| 8,033,464 | B2 | 10/2011 | Windauer et al. | |
| 8,132,351 | B2 | 3/2012 | Potterfield et al. | |
| 8,270,104 | B2 | 9/2012 | Windauer | |
| 8,356,442 | B2 | 1/2013 | Potterfield et al. | |
| 8,479,402 | B2 | 7/2013 | Schmitt | |
| 8,516,736 | B2 | 8/2013 | Windauer | |
| 8,806,798 | B2 | 8/2014 | Crispin | |
| 8,984,796 | B2 * | 3/2015 | Thomas | F41G 1/28 42/119 |
| 8,988,798 | B2 | 3/2015 | Cideciyan et al. | |
| 2003/0140545 | A1 | 7/2003 | Huber | |
| 2004/0088898 | A1 | 5/2004 | Barrett | |
| 2006/0254115 | A1 | 11/2006 | Thomas et al. | |
| 2006/0268433 | A1 | 11/2006 | Thomas | |
| 2006/0278035 | A1 | 12/2006 | Casas | |
| 2007/0240356 | A1 | 10/2007 | Klepp et al. | |
| 2008/0047189 | A1 | 2/2008 | Potterfield et al. | |
| 2008/0066364 | A1 | 3/2008 | Klepp et al. | |
| 2008/0236018 | A1 | 10/2008 | Halverson | |

(56) References Cited

U.S. PATENT DOCUMENTS

| | | |
|---|---|---|
| 2009/0205461 A1 | 8/2009 | Windauer |
| 2011/0100152 A1 | 5/2011 | Huynh |
| 2011/0162250 A1 | 7/2011 | Windauer et al. |
| 2011/0242650 A1 | 10/2011 | Windauer |
| 2011/0261449 A1 | 10/2011 | Schmitt |
| 2012/0030988 A1* | 2/2012 | Windauer ............... F41G 1/38 42/119 |
| 2012/0053878 A1 | 3/2012 | Windauer et al. |
| 2012/0167444 A1 | 7/2012 | Adkins et al. |
| 2012/0174461 A1 | 7/2012 | Potterfield et al. |
| 2012/0186131 A1 | 7/2012 | Windauer |
| 2012/0216653 A1 | 8/2012 | Windauer |
| 2013/0167425 A1 | 7/2013 | Crispin |
| 2014/0137458 A1 | 5/2014 | Crispin |
| 2014/0196351 A1 | 7/2014 | Campean |

FOREIGN PATENT DOCUMENTS

| | | |
|---|---|---|
| DE | 297 20 737 U1 | 2/1998 |
| DE | 299 03 989 U1 | 6/1999 |
| DE | 203 01 749 U1 | 4/2003 |
| DE | 102 22 528 A1 | 12/2003 |
| DE | 20 2006 003 770 U1 | 7/2006 |
| GB | 598306 | 2/1948 |
| GB | 708438 | 5/1954 |
| GB | 1102022 | 2/1968 |
| GB | 1214584 | 12/1970 |
| GB | 2213959 A | 8/1989 |
| JP | 11-085290 A | 3/1999 |
| WO | WO 2006/060490 A2 | 6/2006 |
| WO | WO 2006/109587 A1 | 10/2006 |

OTHER PUBLICATIONS

International Search Report and Written Opinion, International Patent Application No. PCT/US05/43336, mailed Jul. 7, 2008, 4 pages.

Leupold & Stevens, Inc., Complaint for Patent Infringement, *Leupold & Stevens, Inc. v. Lightforce USA, Inc.*, Case No. 3:16-cv-1570-HZ (D. Or.), Aug. 2, 2016, 15 pages.

Lightforce USA, Inc., Answer to Plaintiffs Complaint and Defendant's Counterclaims, *Leupold & Stevens, Inc. v. Lightforce USA, Inc.*, Case No. 3:16-cv-1570-HZ (D. Or.), Dec. 6, 2016, 20 pages.

Lightforce USA, Inc., Lightforce USA, Inc.'s Non-Infringement and Invalidity/Unenforceability Contentions (redacted), *Leupold & Stevens, Inc. v. Lightfforce USA, Inc.*, Case No. 3:16-cv-1570-HZ (D. Or.), Mar. 15, 2017, 89 pages.

Canon Inc., Digital Video Camcorder Instruction Manual for model XL2, 2004 (date of publication unknown), 126 pages.

\* cited by examiner

LOCKING ADJUSTMENT KNOB

RELATED APPLICATIONS

This application is a continuation of and claims the benefit under 35 U.S.C. §120 to U.S. patent application Ser. No. 13/975,218, filed Aug. 23, 2013, which is a continuation of U.S. patent application Ser. No. 13/220,525, filed Aug. 29, 2011, now U.S. Pat. No. 8,516,736, which is a continuation of U.S. patent application Ser. No. 11/720,428, filed May 29, 2007, now U.S. Pat. No. 8,006,429, which is a national phase entry of International Application No. PCT/US2005/043336, filed Nov. 30, 2005, which claims the benefit of U.S. Provisional App. No. 60/632,331, filed Nov. 30, 2004, and U.S. Provisional App. No. 60/638,561, filed Dec. 22, 2004. The entire teachings of each of the above applications are incorporated by reference herein.

BACKGROUND

The present disclosure relates to an optical enhancing device, such as a telescopic observation sighting device or individual shoulder (or hand-fired) firearms sighting device (telescopic sight herein). Embodiments described herein may also be used with any optical enhancing device containing adjusters, such as a microscope, telescope, etc. For purposes of illustration, it will be assumed herein that the optical enhancing device is a telescopic sight.

A telescopic sight, typically used to aim a firearm, is usually mounted on the firearm. An adjustment knob on a telescopic sight is typically used for changing a setting of an adjuster that may change the adjustment of, for example, elevation, crossrange (also "windage" herein), or parallax of the telescopic sight. Parameters such as elevation, crossrange, and parallax may be painstakingly set in order that the firearm hits a specific target. Once set for a particular target, the setting preferably remains unchanged until after a shot is fired.

Existing telescopic sighting systems for civilian, law enforcement, and military firearms typically utilize one or more of three types of adjustment knobs. The first type of adjustment knob, termed a "hunting style" knob, utilizes a cover cap that must be removed prior to adjustment of the sight and replaced after adjustment of the sight to protect the adjustment member of the knob from unintentional adjustment. An advantage of this style of adjustment knob is that it is protected from moisture due to the protection provided by the cover cap. A disadvantage of this type of adjustment knob is that for each adjustment, the cap must be removed and replaced, thereby creating a potential for cap loss.

The second type of adjustment knob is termed a "target style" knob, and is accessible for adjustment at all times. An advantage of this type of adjustment knob is that it is accessible for adjustment at all times without the necessity of removing and replacing a cover cap. A disadvantage is that the adjustment knob can be inadvertently rotated by accidental physical contact.

The third type of adjustment knob is a variation of the "target style" adjustment knob and is a replacement knob used in lieu of the "hunting style" turret knob protective cap. This style of adjustment knob provides a "target style" function, should a marksman choose its use. The advantages and disadvantages of this type of adjustment knob are the same as for the "target style" knob.

What is needed is an adjustment knob that is mechanically lockable, and can be unlocked by an operator when a change in setting is desired.

SUMMARY

According to one embodiment, an adjustment knob is mechanically lockable and can be unlocked by an operator when a change in setting is desired. In particular, a locking turret knob may include an adjustment member, a first member, and a second member. The adjustment member is adjustably positionable about an axis of rotation. The first member is disposed in proximity to the adjustment member and has at least one engagement member. The second member is disposed in proximity to the adjustment member and has at least one engagement surface. The adjustment member is adjustably positionable about the axis of rotation when each engagement member does not engage an engagement surface, and the adjustment member is locked in a selected position about the axis of rotation when at least one engagement member engages an engagement surface. The adjustment member can be coupled to an adjuster of an optical enhancement device, such as a telescopic sight, a telescope or a microscope. A change in the selected position of the adjustment member produces a change in an adjustment setting of the adjuster of the optical enhancement device.

In one embodiment, the first member is fixably coupled to the adjustment member. In another embodiment, the second member is fixably coupled to the adjustment member.

The at least one engagement surface may be an aperture and the at least one engagement member may be a protuberance, such as a pin member, that engages the aperture. In another embodiment, the at least one engagement surface is part of a spline structure. For example, the at least one engagement member can be part of a spline structure that engages the engagement surface of another spline structure. As another example, at least one engagement member can be a protuberance that engages the engagement surface of another spline structure.

According to one embodiment, the adjustment member becomes unlocked in response to application of a force and is adjustably positionable to a newly selected position about the axis of rotation. Accordingly, the adjustment member becomes locked in the newly selected position about the axis of rotation in response to removal of the force.

A locking selection member may be coupled to the first member. The locking selection member is responsive to a force, such as a pulling force or a pushing force, applied to the locking selection member by causing each engagement member of the first member to disengage each engagement surface of the second member. When the force is removed or another force is applied, the locking selection member enables each engagement member of the first member to engage a corresponding engagement surface of the second member. One alternative embodiment provides that the force rotates the locking selection member when the force is applied in a first rotational direction. Accordingly, when the force is removed and when a second force is applied to the locking selection member in a second rotational direction, the locking selection member enables at least one engagement member of the first member to engage a corresponding engagement surface of the second member.

A method of manufacturing a locking turret knob may include providing an adjustment member adjustably positionable about an axis of rotation, providing a first member disposed in proximity to the adjustment member and having at least one engagement member; and providing a second member disposed in proximity to the adjustment member and having at least one engagement surface, such that the adjustment member is adjustably positionable about the axis of rotation when each engagement member does not engage an engagement surface, and the adjustment member being locked in a selected position about the axis of rotation when at least one engagement member engages an engagement surface.

BRIEF DESCRIPTION OF THE DRAWINGS

Various embodiments are illustrated by way of example and not by limitation in the accompanying figures in which like reference numerals indicate similar elements and in which.

DETAILED DESCRIPTION OF PREFERRED EMBODIMENTS

According to one embodiment, an adjustment knob is provided for an optical setting, such as elevation, windage, parallax, or illuminated reticle power control of an optical-based instrument, such as a telescopic sighting system, a telescope or a microscope, that is mechanically lockable and weather proof, thereby eliminating inadvertent adjustment of an optical setting by accidental physical contact. Accordingly, the user may mechanically unlock the adjustment knob to make a desired adjustment of an optical or power setting. Thus, optical or power settings made by a user are reliably maintained regardless of the environmental conditions or whether the adjustment knob is accidentally touched.

Figure 1:
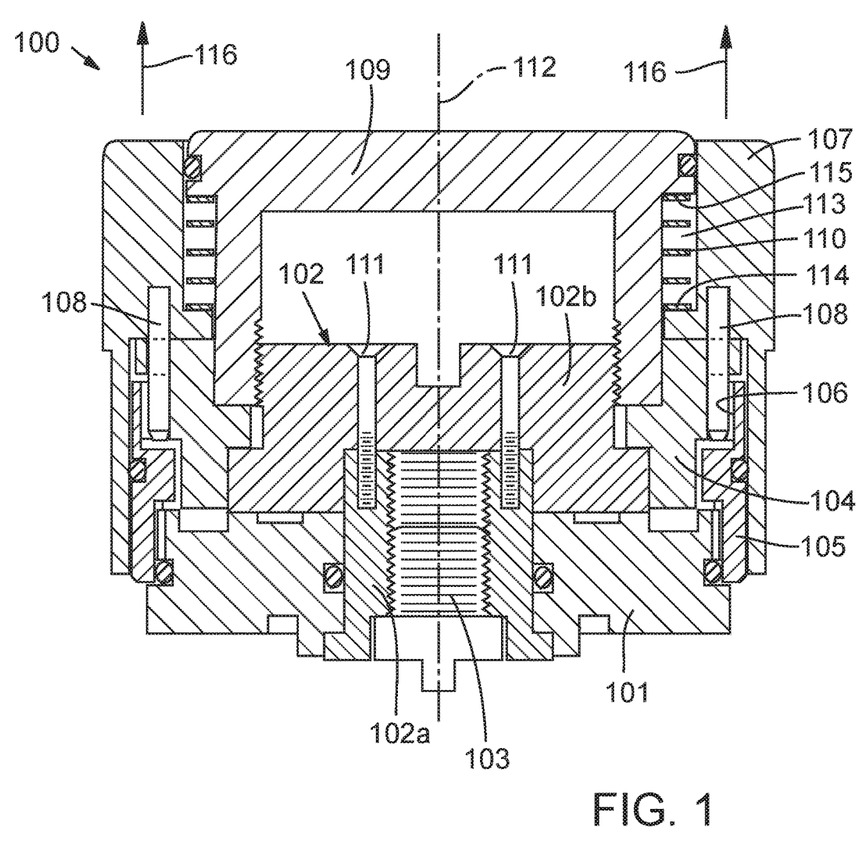
FIG. 1 shows a side cross-sectional view of one example of a locking pin turret knob assembly in an engaged, or locked, configuration.
Figure 2:
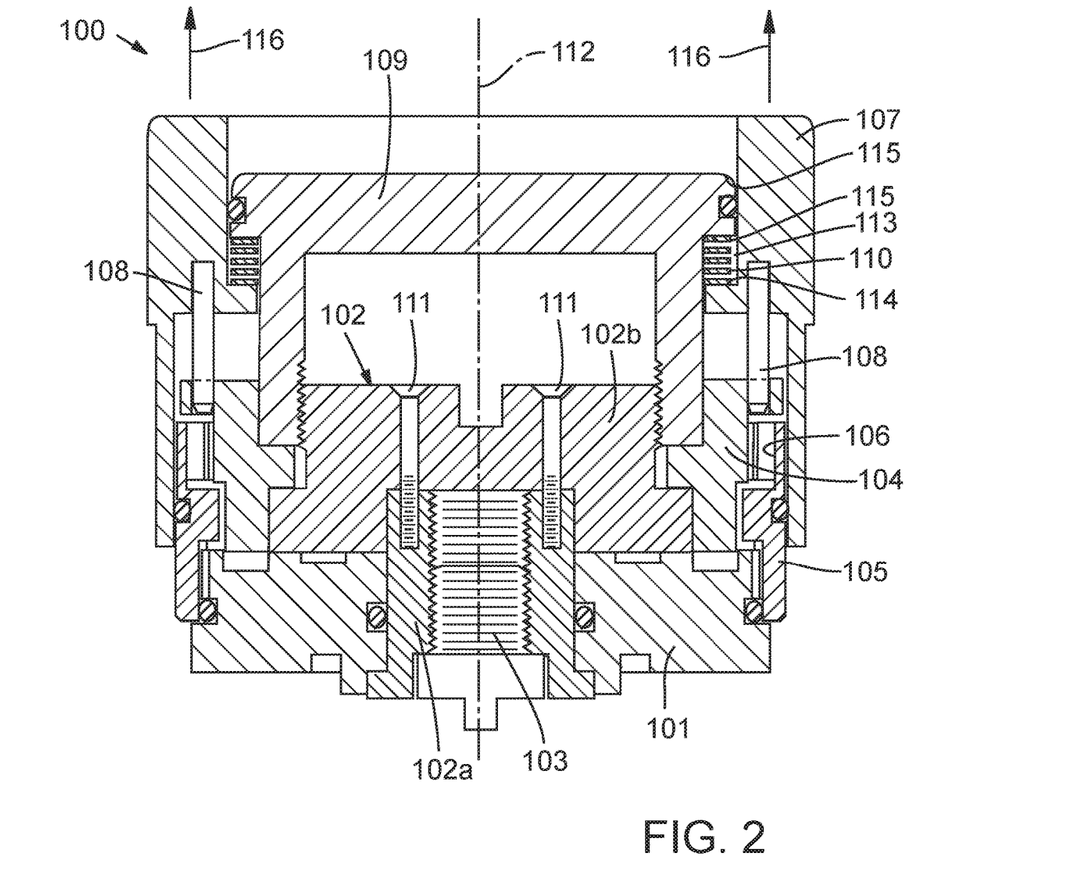
FIG. 2 shows a side cross-sectional view of the locking pin turret knob assembly shown in FIG. 1 in a disengaged, or unlocked, configuration.

FIG. 1 shows a side cross-sectional view of one example of a locking pin turret knob assembly 100 in an engaged, or locked, configuration. FIG. 2 shows a side cross-sectional view of the locking pin turret knob assembly 100 in a disengaged, or unlocked, configuration Locking pin turret knob assembly 100 includes a turret plate base 101, an adjustment nut assembly 102 having a lower section 102a and an upper section 102b, a spade screw 103, a spur ring 104, a locking ring 105, a plurality of locking ring splines 106, an index ring 107, a plurality of locking pins 108, a spring member 110 and a turret assembly nut 109. Turret base plate 101 is fixedly attached to, for example, a telescopic sight or other optical enhancing device (not shown). The lower section of adjustment nut assembly 102a fits inside an aperture (not indicated for clarity) that is formed in and passes through turret base plate 101. In particular, adjustment nut assembly lower section 102a and upper section 102b are held together by screws 111 in a manner that allows adjustment nut assembly 102 to be fixedly engaged with turret base plate 101 and freely rotate in the aperture formed in turret base plate 101 about an axis 112. Adjustment nut assembly 102 threadably engages the upper section of spade screw 103. The lower rectangular section of spade screw 103 passes through a slot in the body of the telescopic sight and mechanically engages an optical adjustor (not shown) of the telescopic sight.

Spur ring 104 fixedly fits around adjustment nut assembly upper section 102b. Locking ring 105, which includes a plurality of locking ring splines 106, fixedly fits around turret base plate 101. Locking ring splines 106 define one or more spline valleys defining engagement surfaces. Index ring 107 fits onto spur ring 104 and around locking ring 105. A plurality of locking pins 108 are fixedly attached to index ring, engage apertures in spur ring 104 and engage locking ring splines 106 when index ring is fitted onto spur ring 104 and around locking ring 105. Turret assembly nut 109 threadably engages adjustment nut assembly upper section 102b and forms a cavity 113 into which spring member 110 fits. That is, spring member 110 fits into cavity 113 between a top surface 114 of index ring 107 and an inner surface 115 of turret assembly nut 109.

When locking pin turret knob assembly 100 is in a locked configuration, locking pins 108 engage locking ring splines 106 of fixed locking ring 105 so that index ring 107, spur ring 104, assembly nut 109, and adjustment nut assembly 102 cannot be rotated around axis 112 and, consequently, spade screw 103 cannot adjust the corresponding optical adjustment of the telescopic sight.

FIG. 2 shows a side cross-sectional view of locking pin turret knob assembly 100 in a disengaged, or unlocked, configuration. By applying a force that moves index ring 107 along axis 112 in a direction 116 away from telescopic sight (i.e., pulling index ring 107 away from the telescopic sight), spring member 110 compresses within cavity 113 and locking pins 108 disengage locking ring splines 106. While in the unlocked configuration, fixed locking pins 108 of index ring 107 remain in engagement with the apertures of spur ring 104, and spur ring 104 is fixedly engaged with adjustment nut assembly 102. Index ring 107 can be rotated around axis 112, thereby also rotating spur ring 104, assembly nut 109, and adjustment nut assembly 102 around spade screw 103 which is fixed from rotation by the lower rectangular portion of the spade screw 103 passing through a slot in the telescopic sight body. Rotation of adjustment nut assembly 102 around spade screw 103 results in a linear movement of spade screw 103 and optical adjustment of the telescopic sight.

While FIGS. 1 and 2 show and have been described by making reference to a plurality of locking pins, it should be understood that only a single locking pin is needed. Additionally, while locking splines 106 have been described, it should be understood that a mechanical member having a plurality of apertures that engage locking pins 108 can alternatively be used. According to another embodiment, locking pins, which are fixedly attached to a structure corresponding to locking ring 105, could lockably and unlockably engage locking spline structures that are part of the index ring.

A marksman may calibrate the locking turret knob illustrated in FIGS. 1 and 2, i.e., reorient the orientation of index ring 107 relative to adjustment nut assembly lower section 102a, as follows: At a predetermined distance, the marksman adjusts an adjuster setting, e.g., elevation, windage or parallax, by unlocking locking pin turret knob 100, rotating locking turret knob index ring 107, and releasing index ring 107 to relock the adjuster. Turret assembly nut 109, detachably coupled (e.g., via screw threads between turret assembly nut 109 and adjustment nut assembly upper section 102b) to adjustment nut assembly upper section 102b, is then uncoupled from adjustment nut assembly upper section 102b. Index ring 107 may then be pulled by the marksman away from the body of locking pin turret knob 100 so that locking pins 108 disengage from lock ring 105, thereby allowing the marksman to selectively orient index ring 107 without causing any adjustment of spade screw 103. Index ring 107 can then be zeroed (by rotating around its axis of rotation) so that, for example, a zero-point mark (not shown) on index ring 107 is aligned with an index mark (not shown) on turret base plate 101. Turret assembly nut 109 is then re-coupled and tightened to adjustment nut assembly upper section 102b, which re-engages spring member 110. Index ring 107 is then biased toward adjustment nut assembly upper section 102b, engaging locking pins 108 with the locking ring splines 106 of lock ring 105, thereby re-establishing the locked configuration.

Figure 3:
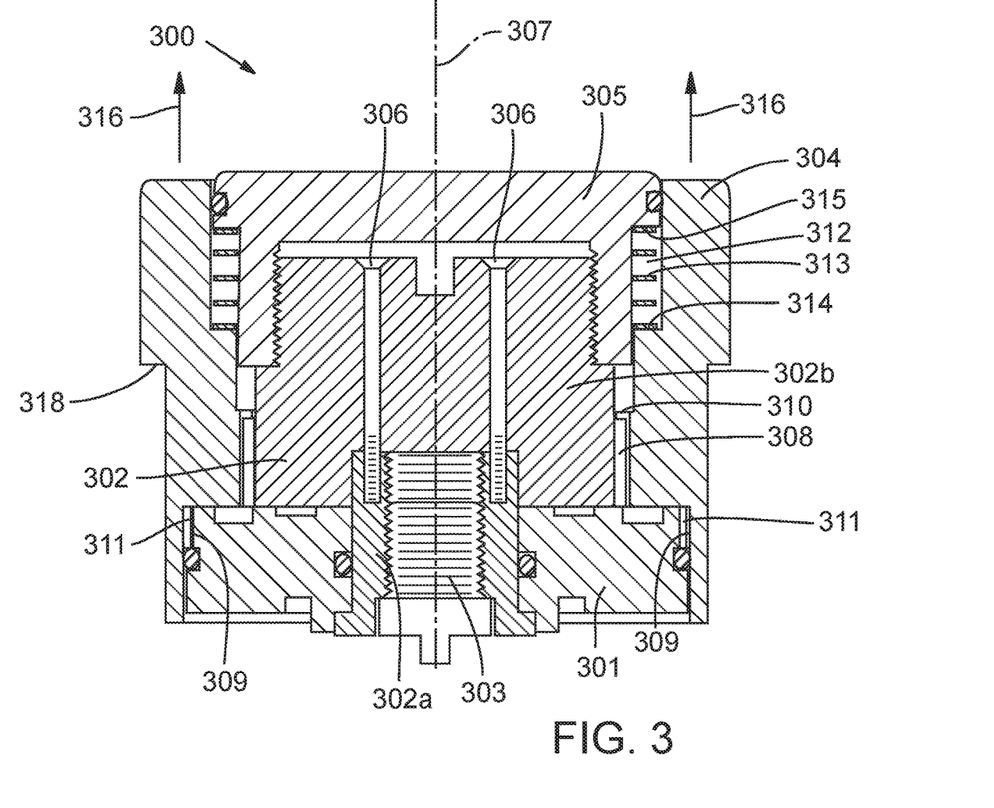
FIG. 3 shows a side cross-sectional view of one example of a locking spline turret knob assembly in an engaged, or locked, configuration.
Figure 4:
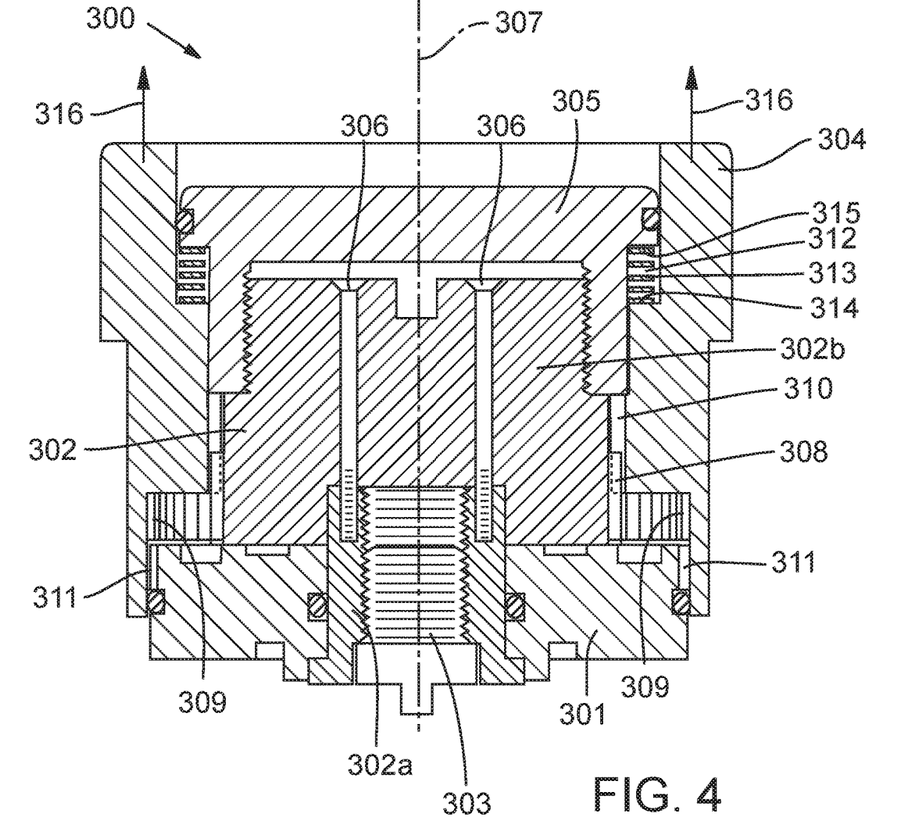
FIG. 4 shows a side cross-sectional view of the locking spline turret knob assembly shown in FIG. 3 in a disengaged, or unlocked, configuration.

FIG. 3 shows a side cross-sectional view of one example of a locking spline turret knob assembly 300 in an engaged, or locked, configuration. FIG. 4 shows a side cross-sectional view of the locking spline turret knob assembly 300 in a disengaged, or unlocked, configuration.

Locking spline turret knob assembly 300 includes a turret base plate 301, an adjustment nut assembly 302 having a lower section 302a and an upper section 302b, a spade screw 303, an index ring 304, and a turret assembly nut 305. Turret base plate 301 is fixedly attached to, for example, a telescopic sight or other optical enhancing device (not shown). The lower section of adjustment nut assembly 302a fits inside an aperture (not indicated for clarity) that is formed in and passes through turret base plate 301. In particular, adjustment nut assembly lower section 302a and upper section 302b are held together by screws 306 in a manner that allows adjustment nut assembly 302 to be fixedly engaged with turret base plate 301 and freely rotate in the aperture formed in turret base plate 301 about an axis 307. Adjustment nut assembly 302 threadably engages the upper section of spade screw 303. The lower rectangular section of spade screw 303 passes through a slot in the body of the telescopic sight and mechanically engages an optical adjustor (not shown) of the telescopic sight.

Index ring 304 fits around adjustment nut assembly upper section 302b and includes a plurality of mating splines 308 and a plurality of locking splines 309. Index ring mating splines 308 engage adjustment nut mating splines 310 of adjustment nut assembly upper section 302b as index ring 304 fits around adjustment nut assembly upper section 302b. Index ring locking splines lockably engage turret base plate locking splines 311 when locking turret knob assembly 300 is in the locked configuration. Turret assembly nut 305 threadably engages adjustment nut assembly upper section 302b and forms a cavity 312 into which a spring member 313 fits. That is, spring member 313 fits into cavity 312 between a top surface 314 of index ring 304 and an inner surface 315 of turret assembly nut 305.

When locking pin turret knob assembly 300 is in a locked configuration, index ring locking splines 309 engage turret base plate locking splines 311 so that adjustment nut assembly 302, index ring 304, and turret assembly nut 305 cannot be rotated around axis 307 and, consequently, spade screw 303 cannot adjust the corresponding optical adjustment of the telescopic sight.

FIG. 4 shows a side cross-sectional view of locking pin turret knob assembly 300 in a disengaged, or unlocked, configuration. By applying a force that moves index ring 304 along axis 307 in a direction 316 away from telescopic sight (i.e., pulling index ring 304 away from the telescopic sight), spring member 313 compresses within cavity 312 and index ring locking splines 309 disengage turret base plate locking splines 311. While in the unlocked configuration, index ring mating splines 308 continue to engage adjustment nut assembly mating splines 310 of adjustment nut assembly upper section 302b and thereby engage adjustment nut assembly 302. Index ring 304 can be rotated around axis 307, thereby also rotating turret assembly nut 305, and adjustment nut assembly 302 around spade screw 303 which is fixed from rotation by the lower rectangular portion of the spade screw 303 passing through a slot in the telescopic sight body. Rotation of adjustment nut assembly 302 around spade screw 303 results in a linear movement of spade screw 303 and optical adjustment of the telescopic sight.

When adjustment is completed, the marksman releases index ring 304, and spring member 313 biases index ring 304 toward turret base plate 301, thereby returning locking turret knob assembly 300 to the locked configuration.

A marksman may calibrate locking turret knob assembly 300 depicted in FIGS. 3 and 4, as follows. For a predetermined target distance, the marksman adjusts an adjuster setting, e.g., elevation, windage or parallax, by unlocking locking turret knob assembly 300, rotating index ring 304 for the desired calibration and then releasing the index ring 304 to relock locking turret knob assembly 300. Turret assembly nut 305, which is threadably coupled to adjustment nut assembly upper section 302b, is unthreaded from adjustment nut assembly upper section 302b, which releases spring member 313, thereby allowing index ring mating splines 308 to become disengaged from adjustment nut assembly mating splines 310. As illustrated in FIG. 3, index ring 304 may have a smaller exterior diameter on a bottom portion transitioning via a protruding shoulder 318 to an upper portion with a larger exterior diameter. Index ring 304 can then be pulled by the marksman in the direction indicated by arrow 316, thus uncoupling index ring mating splines 308 from adjustment nut assembly mating splines 310. The marksman can then rotate index ring 304 to a desired calibration setting without causing any adjustment of spade screw 303. That is, index ring 304 can then be zeroed by rotating index ring so that a zero-point mark (not shown) on index ring 304 is aligned with an index mark (not shown) on turret base plate 301. Turret assembly nut 305 is then rethreaded and tightened onto adjustment nut assembly upper section 302b, thereby enabling spring member 313 to bias index ring 304 toward adjustment nut assembly upper section 302b. Index ring mating splines 308 re-engage with adjustment nut assembly mating splines 310 and index ring locking splines 309 re-engage with turret base plate locking splines 311, thereby re-establishing a locked configuration of locking turret knob assembly 300, such as shown in FIG. 3.

Figure 5A:
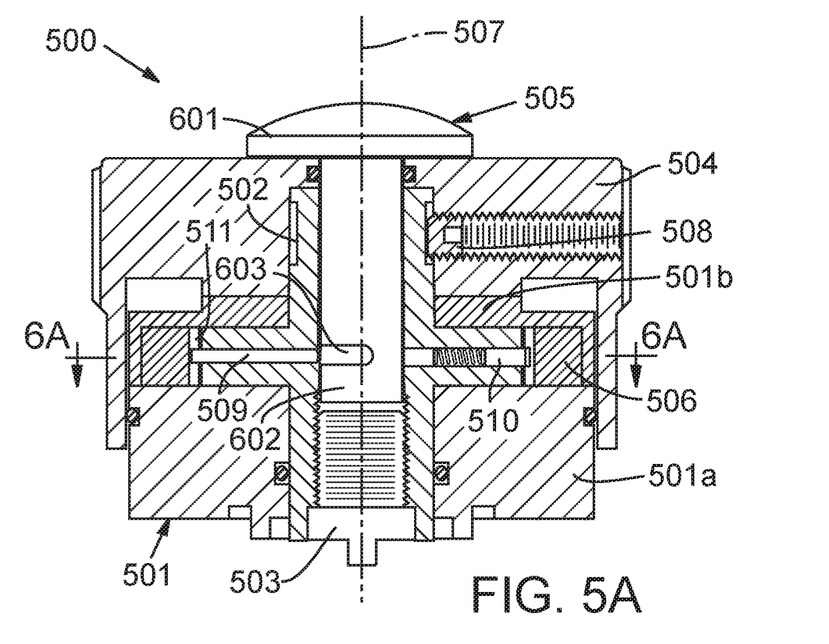
FIG. 5A shows a side cross-sectional view of one example of a cam-actuated locking turret knob assembly in an engaged, or locked, configuration.
Figure 5B:
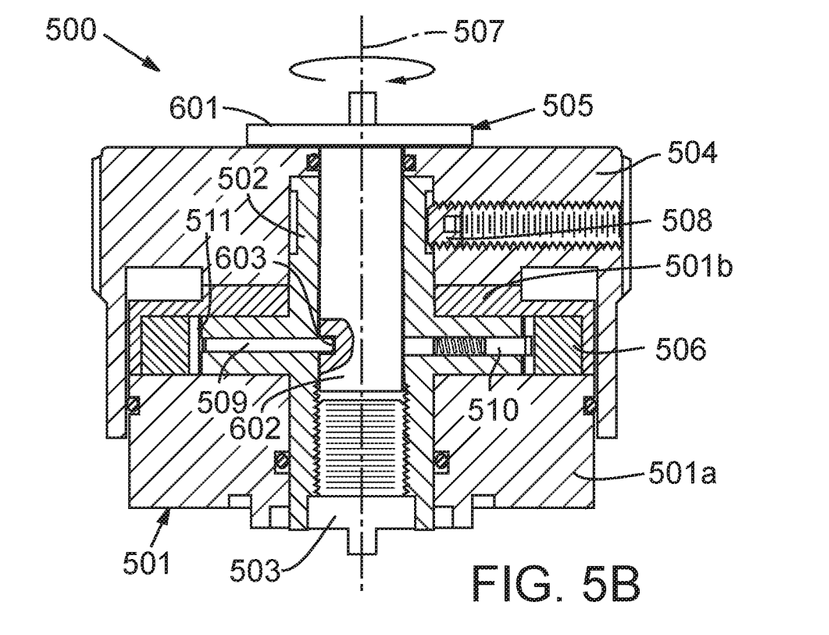
FIG. 5B shows a side cross-sectional view of the cam-actuated locking turret knob assembly of FIG. 5A in an unengaged, or unlocked, configuration.
Figure 6A:
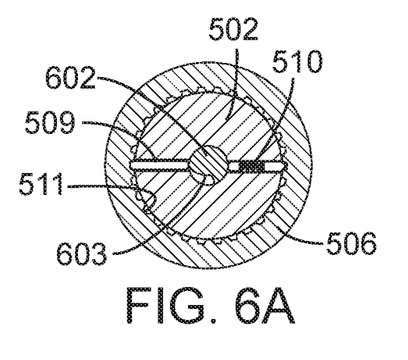
FIG. 6A shows a cross-sectional view of the turret knob shown in FIG. 5A taken along line 6A-6A in FIG. 5A.

FIG. 5A shows a side cross-sectional view of one example of a cam-actuated locking turret knob assembly 500 in an engaged, or locked, configuration. FIG. 5B shows a side cross-sectional view of the cam-actuated locking turret knob assembly of FIG. 5A in an unengaged, or unlocked, configuration. FIGS. 6A 6D show different views of a locking selector 505 that can be used with the cam-actuated locking turret knob assembly 500.

Cam-actuated locking turret knob assembly 500 includes a turret base plate 501 formed by a lower section 501a and an upper section 501b, an adjustment nut assembly 502, a spade screw 503, an index ring 504, a locking selector 505 and a locking ratchet ring 506. Turret base plate 501 is fixedly attached to, for example, a telescopic sight or other optical enhancing device (not shown). Adjustment nut assembly 502 fits inside an aperture (not indicated for clarity) that is formed in and passes through turret base plate 501. Adjustment nut assembly 502 is fixedly engaged with turret base plate 501 and is free to rotate in the aperture formed in turret base plate 501 about an axis 507. Adjustment nut assembly 502 threadably engages the upper section of spade screw 503. The lower rectangular section of spade screw 503 passes through a slot in the body of the telescopic sight and mechanically engages an optical adjustor (not shown) of the telescopic sight. Locking ratchet ring 506 is fixedly attached to turret base plate 501.

Index ring 504 fits around turret base plate 501 and is fixedly held to adjustment nut assembly 502 by a set screw 508. Locking selector 505 fits into an aperture formed in index ring 504 and engages locking ratchet ring 506 with a cam-actuated locking wedge pin 509. When cam-actuated locking wedge pin 509 is engaged with locking ratchet ring 506, locking turret knob assembly 500 is in locked position, as shown in FIG. 5A, thereby rendering index ring 504 unable to be rotated about axis of rotation 507. A spring-loaded ratchet pin 510 can also be optionally used so that when locking turret knob assembly 500 is unlocked (i.e., cam-actuated locking wedge pin 509 is disengaged from locking ratchet ring 506), an adjustment made by rotating locking turret knob assembly 500 will have a tactile feel. In the unlocked configuration, cam-actuated locking wedge pin 509 is disengaged from locking ratchet ring 506, and index ring 504 and adjustment nut assembly 502 can be rotated around axis 507, thereby rotating around spade screw 503 which is fixed from rotation by the lower rectangular portion of the spade screw 503 passing through a slot in the telescopic sight body. Rotation of adjustment assembly nut 502 around spade screw 503 results in a linear movement of spade screw 503 and optical adjustment of the telescopic sight.

Figure 6B:
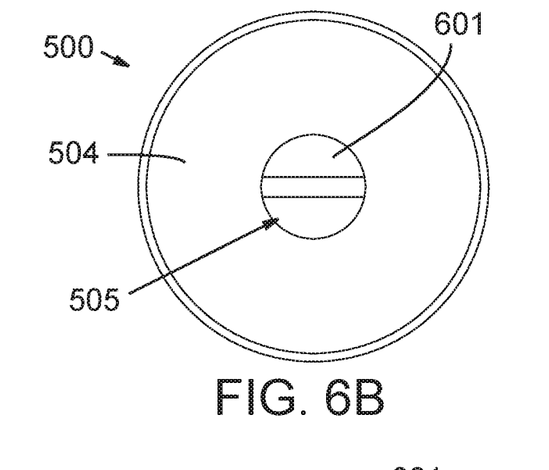
FIG. 6B shows a top view of the turret knob of FIG. 5A showing detail of a locking selector thereof.
Figure 6C:
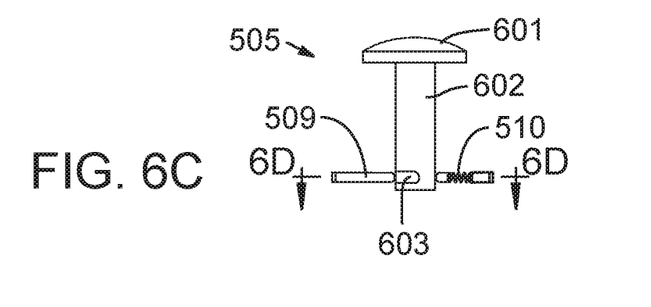
FIG. 6C shows a side view of the locking selector shown in FIG. 6B with other components of the locking turret knob omitted for clarity.
Figure 6D:
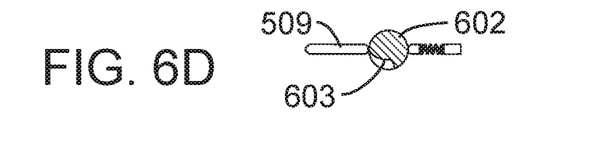
FIG. 6D shows a cross-sectional view of the locking selector shown in FIG. 6C taken along line 6D-6D in FIG. 6C.

FIGS. 6A-6D show different views of locking selector 505 that can be used with the cam-actuated locking turret knob assembly 500. In particular, FIG. 6A shows a cross-sectional view of locking selector 505 with respect to locking ratchet ring 506. FIG. 6B shows a top view of locking selector 505 and locking turret knob assembly 500. FIG. 6C shows a side view of locking selector 505. FIG. 6D shows a cross-sectional view of locking selector 505 taken along line 6D-6D in FIG. 6C.

Locking selector 505 includes a selector knob 601, a selector shaft 602 and a cam surface 603. When a telescopic sight adjustment is desired, selector knob 601 is grasped and rotated around axis 507 (FIG. 5A) from a locked position to an unlocked position. In the unlocked position, cam surface 603 of a selector shaft 602 disengages cam-actuated locking wedge pin 509 from locking ratchet ring 506 and allows index ring 504 to be rotated about axis of rotation 507 (FIG. 5A).

Upon completion of an adjustment, locking selector 505 is then rotated by the marksman to the locked position. In the locked position, cam surface 603 of locking selector shaft 602 pushes outwardly on cam-actuated locking wedge pin 509 to engage cam-activated locking wedge pin 509 with grooves 511 (FIGS. 5A and 6A) of locking ratchet ring 506. Locking ratchet ring 506 is fixedly coupled to turret base plate 501, thereby preventing inadvertent adjustment of index ring 504 and spade screw 503.

Figure 7A:
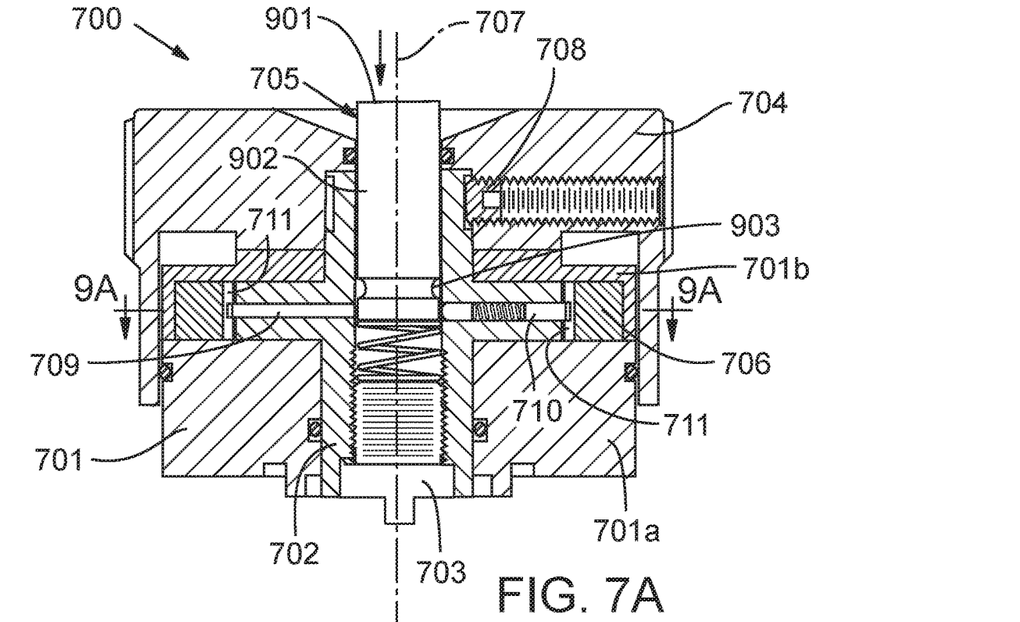
FIG. 7A shows a side cross-sectional view of one example of a locking turret knob assembly in an engaged, or locked, configuration.
Figure 7B:
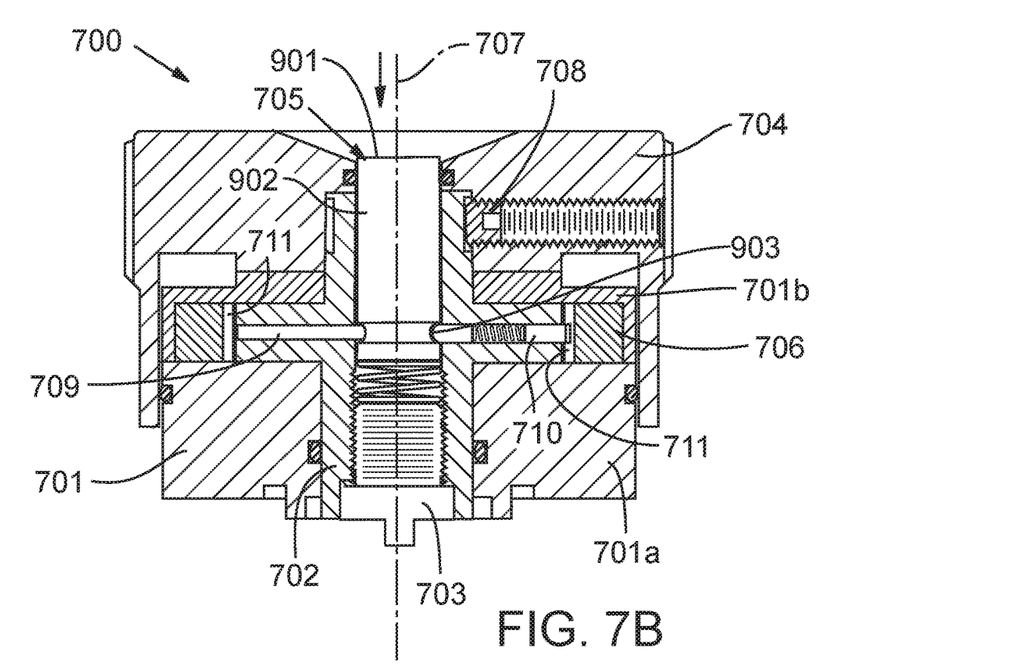
FIG. 7B shows a side cross-sectional view of the locking turret knob assembly of FIG. 7A in an unengaged, or unlocked, configuration.

FIG. 7A shows a side cross-sectional view of one example of a locking turret knob assembly 700 in an engaged, or locked, configuration. FIG. 7B shows a side cross-sectional view of the locking turret knob assembly of FIG. 7A in an unengaged, or unlocked, configuration. FIGS. 9A-9D show different views of a push-unlocking selector 705 that can be used with the locking turret knob assembly 700, shown in FIG. 7A.

Locking turret knob assembly 700 includes a turret base plate 701 formed by a lower section 701a and an upper section 701b, an adjustment nut assembly 702, a spade screw 703, an index ring 704, a push-unlocking selector 705 and a locking ratchet ring 706. Turret base plate 701 is fixedly attached to, for example, a telescopic sight or other optical enhancing device (not shown). Adjustment nut assembly 702 fits inside an aperture (not indicated for clarity) that is formed in and passes through turret base plate 701. Adjustment nut assembly 702 is fixedly engaged with turret base plate 701 and is free to rotate in the aperture formed in turret base plate 701 about an axis 707. Adjustment nut assembly 702 threadably engages the upper section of spade screw 703. The lower rectangular section of spade screw 703 passes through a slot in the body of the telescopic sight and mechanically engages an optical adjustor (not shown) of the telescopic sight. Locking ratchet ring 706 is fixedly attached to turret base plate 701.

Index ring 704 fits around turret base plate 701 and is fixedly held to adjustment nut assembly 702 by a set screw 708. Index ring 704 also engages locking ratchet ring 706. Push-unlocking selector 705 fits into an aperture formed in index ring 704 and engages locking ratchet ring 706 with a plunger-actuated locking wedge pin 709. When push/pull locking wedge pin 709 is engaged with locking ratchet ring 706, locking turret knob assembly 700 is in locked position, as shown in FIG. 7A, thereby rendering index ring 704 unable to be rotated about axis of rotation 707. A spring-loaded wedge pin 710 can also be optionally used so that when locking turret knob assembly 700 is unlocked (i.e., plunger-actuated locking wedge pin 709 is disengaged from locking ratchet 706), an adjustment made by rotating locking turret knob assembly 700 will have a tactile feel. In the unlocked configuration, plunger-actuated locking wedge pin 709 is disengaged from locking ratchet ring 706, and index ring 704 and adjustment nut assembly 702 can be rotated around axis 707 and spade screw 703 which is fixed from rotation by the lower rectangular portion of the spade screw 703 passing through a slot in the telescopic sight body. Rotation of adjustment nut assembly 702 around spade screw 703 results in a linear movement of spade screw 703 and optical adjustment of the telescopic sight.

Figure 8A:
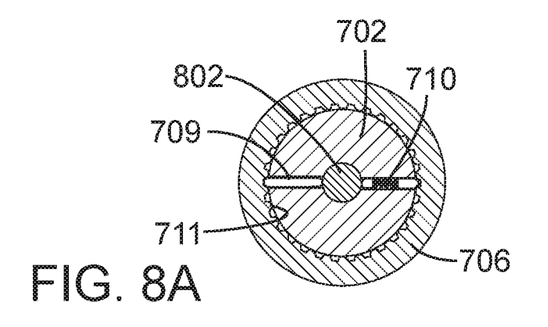
FIG. 8A shows a cross-sectional view of one example of a push/pull locking selector that can be used with the locking turret knob shown in FIG. 7A with respect to one example of a locking ratchet ring.
Figure 8B:
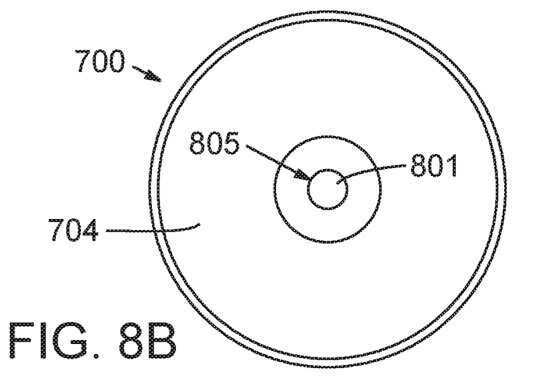
FIG. 8B shows a top view of the push/pull locking selector of FIG. 8A and one example of a locking turret knob assembly.
Figure 8C:
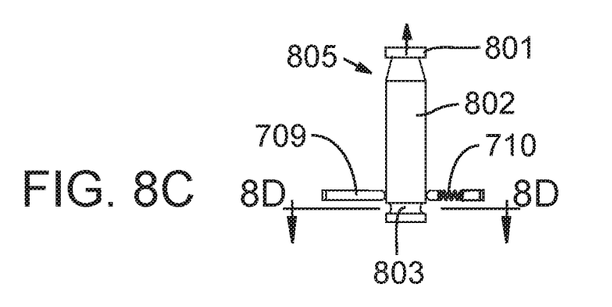
FIG. 8C shows a side view of the push/pull locking selector shown in FIG. 8A with certain other components of the locking turret knob omitted for clarity.
Figure 8D:
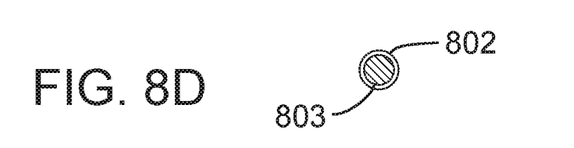
FIG. 8D shows a cross-sectional view of the push/pull locking selector shown in FIG. 8C taken along line 8D-8D in FIG. 8C.

FIGS. 8A-8D show different views of the push/pull locking selector 805 that can be used with the locking turret knob assembly 700, shown in FIG. 7A, as an alternative to push un-locking selector 905. In particular, FIG. 8A shows a cross-sectional view of push/pull locking selector 805 with respect to locking ratchet ring 706. FIG. 8B shows a top view of push/pull locking selector 805 and locking turret knob assembly 700. FIG. 8C shows a side view of push/pull locking selector 805. FIG. 8D shows a cross-sectional view of push/pull locking selector 805 taken along line 8D-8D in FIG. 8C.

Push/pull locking selector 805 includes a selector knob 801, a selector shaft 802 and a circumferential groove 803. When a telescopic sight adjustment is desired, selector knob 801 is grasped and pulled in an outwardly direction along axis 707 (FIG. 7A) from a locked position to an unlocked position. In the unlocked position, circumferential groove 803 of a selector shaft 802 allows plunger-actuated locking wedge pin 709 to drop into circumferential groove 803, thereby disengaging locking wedge pin 709 from locking ratchet ring 706 and allowing index ring 704 to be rotated about axis of rotation 707 (FIG. 7A).

Upon completion of an adjustment, push/pull locking selector 805 is then pushed in an inwardly direction along axis 707 (FIG. 7A) from the unlocked position to the locked position. In the locked position, circumferential groove 803 of locking selector shaft 802 moves below locking wedge pin 809 and selector shaft 802 pushes outwardly on plunger-actuated locking wedge pin 709 to engage plunger-activated locking wedge pin 709 with grooves 711 (FIGS. 7A and 8A) of locking ratchet ring 706. Locking ratchet ring 706 is fixedly coupled to turret base plate 701, thereby preventing inadvertent adjustment of index ring 704 and spade screw 703.

Figure 9A:
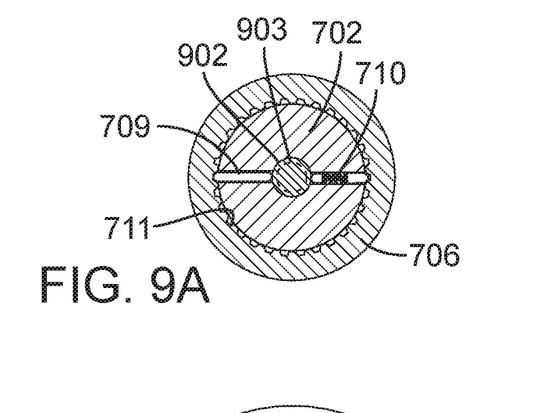
FIG. 9A shows a cross-sectional view of the locking turret knob of FIG. 7A taken at line 9A-9A in FIG. 7A, showing detail of a push unlock selector.
Figure 9B:
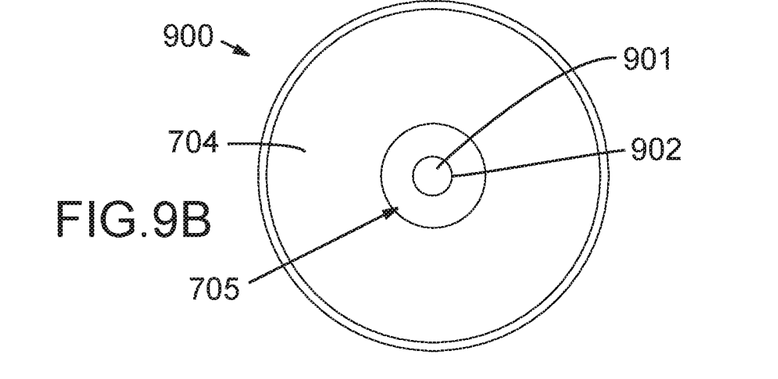
FIG. 9B shows a top view of the push unlocking selector shown in FIG. 9A and one example of a locking turret knob assembly.
Figure 9C:
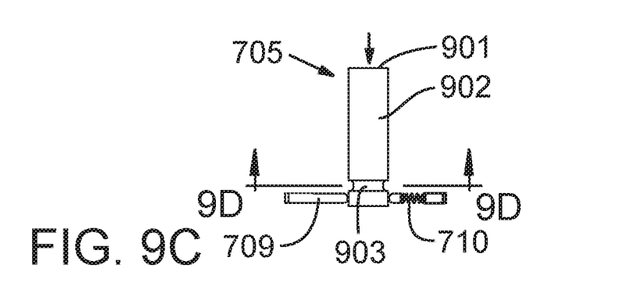
FIG. 9C shows a side view of the push unlocking selector shown in FIG. 9A with certain other components of the locking turret knob omitted for clarity.
Figure 9D:
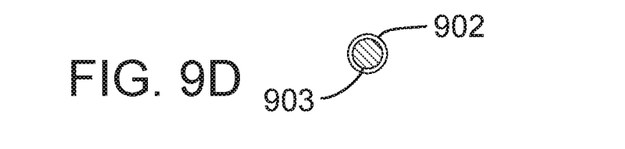
FIG. 9D shows a cross-sectional view of the push unlocking selector shown in FIG. 9C taken along line 9D-9D in FIG. 9C.

FIGS. 9A-9D show different views of the push unlocking selector 705 that can be used with a locking turret knob assembly, such as locking turret knob assembly 700 shown in FIG. 7A. In particular, FIG. 9A shows a cross-sectional view of push unlocking selector 705 with respect to a locking ratchet ring 706. FIG. 9B shows a top view of push unlocking selector 705 and the locking turret knob assembly 700. FIG. 9C shows a side view of push unlocking selector 705. FIG. 9D shows a cross-sectional view of push unlocking selector 705 taken along line 9D-9D in FIG. 9C.

Push unlocking selector 705 includes a push selector knob 901, a selector shaft 902 and a circumferential groove 903. When a telescopic sight adjustment is desired, selector knob 901 is pushed inwardly from a locked position to an unlocked position. In the unlocked position, circumferential groove 903 of a selector shaft 902 moves inward and allows plunger-actuated locking wedge pin 709 to disengage from locking ratchet ring 706 and allows an index ring (not shown) to be rotated about an axis of rotation (not shown).

Upon completion of an adjustment, selector knob 901 is then released from the unlocked position to the locked position. In the locked position selector shaft 902 moves outward thereby moving circumferential groove 903 of selector shaft 902 to move above wedge pin 709. The lower section of selector shaft 902 pushes outwardly on locking wedge pin 709 to engage plunger-activated locking wedge pin 709 with grooves 711 (FIGS. 7A and 9A) of locking ratchet ring 706. Locking ratchet ring 706 is fixedly coupled to a turret base plate (not shown), thereby preventing inadvertent adjustment of the index ring and a spade screw.

Figure 10:
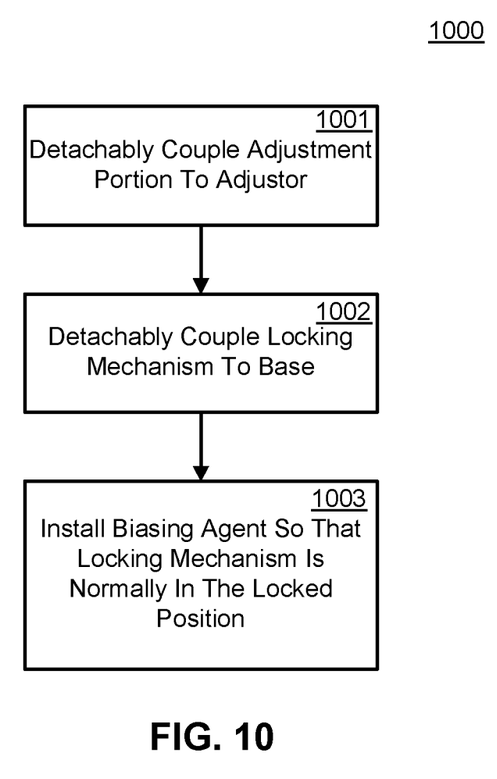
FIG. 10 shows a flow diagram for making a locking turret knob according to one embodiment.

FIG. 10 shows a flow diagram 1000 for making a locking turret knob according to one embodiment. An adjustment member is detachably coupled at 1001 to an adjuster, such that the axis of rotation of the adjustment member coincides with the axis of rotation of the adjuster. At 1002, an adjustment member locking mechanism is then coupled to the base for preventing unintended rotation of the adjustment member. With the locking turret knob in the normally locked state, a marksman can unlock the index ring in order to perform an adjustment. When the adjustment member is unlocked, rotating the adjustment member produces an adjustment of the adjuster. At 1003, a spring member, such as a spring, may be provided for producing a biasing force on the adjustment member, thereby rendering the adjustment member normally coupled to the base, i.e., locked. Operator-supplied force counteracting the biasing force uncouples the adjustment member from the base, enabling the operator to effect an adjustment of the adjuster via, e.g., rotating the index ring.

It should be understood that the locking turret knob assemblies described herein can be used as adjustment knobs for a telescopic sight or any other optical-based instrument having adjustment knobs, for example an optical enhancing device such as a lens or microscope, telescope, etc.

Although the foregoing description includes some detail for purposes of clarity of understanding, it will be apparent that certain changes and modifications may be made to the details of the above-described embodiments that are within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. An adjustment apparatus for a sighting device, the adjustment apparatus comprising:
   an adjustment mechanism mountable to the sighting device, the adjustment mechanism configured to adjust a setting of the sighting device;

an adjustment knob operatively coupled to the adjustment mechanism, wherein rotation of the adjustment knob about a rotational axis drives the adjustment mechanism and adjusts the setting of the sighting device; and a lock mechanism including:
a first lock element fixed relative to the sighting device; and
a second lock element selectively movable relative to the first lock element, wherein the first and second lock elements engage one another in a locked position to restrain rotation of the adjustment knob about the rotational axis, and wherein the first and second lock elements are disengaged in an unlocked position to allow the adjustment knob to be rotated about the rotational axis.

2. The adjustment apparatus of claim 1, further comprising a lock-release mechanism operatively coupled to the lock mechanism, the lock-release mechanism manually actuatable to disengage the first and second lock elements from the locked position and allow the adjustment knob to be rotated about the rotational axis.

3. The adjustment apparatus of claim 2, further comprising a biasing member operatively coupled with the lock-release mechanism, wherein, when the adjustment knob is in the locked position, the biasing member exerts a force on the lock-release mechanism to maintain the adjustment knob in the locked position.

4. The adjustment apparatus of claim 2, wherein the lock-release mechanism is rotatable about the rotational axis relative to the adjustment knob to disengage the first and second lock elements.

5. The adjustment apparatus of claim 1, wherein the second locking element is carried by the adjustment knob for rotation therewith, and wherein the second locking element is further movable relative to the adjustment knob.

6. The adjustment apparatus of claim 1, wherein the first lock element includes a locking surface having one or more engagement features formed thereon.

7. The adjustment apparatus of claim 6, wherein the one or more engagement features includes one or more apertures formed on the locking surface.

8. The adjustment apparatus of claim 6, wherein the second lock element includes a locking pin, and wherein at least a portion of the locking pin engages one of the one or more engagement features on the locking surface when the adjustment knob is in the locked position.

9. The adjustment apparatus of claim 6, wherein the locking pin is an elongated locking pin extending in a radial direction relative to the axis of rotation of the adjustment knob.

10. The adjustment apparatus of claim 1, wherein the adjustment knob is lockable at a first selected locked position and at a second selected locked position rotatably offset about the rotational axis relative to the first selected locked position.

11. The adjustment apparatus of claim 1, wherein the second lock element is movable in a radial direction relative to the axis of rotation of the adjustment knob.

12. The adjustment apparatus of claim 1, wherein the setting of the sighting device comprises one of the following: an elevation setting, a windage setting, a parallax setting, or an illuminated reticle power control setting.

13. The adjustment apparatus of claim 1, wherein the adjustment mechanism includes an adjustment member threaded to the adjustment knob and restrained from rotating about the axis of rotation, and wherein rotation of the adjustment knob about the axis of rotation is translated into linear motion of the adjustment member along the axis of rotation to adjust the setting of the sighting device.

14. The adjustment apparatus of claim 1, further comprising a detent mechanism biased against the first lock element, the detent mechanism producing a tactile feel when the adjustment knob is rotated about the rotational axis.

15. The adjustment apparatus of claim 1, wherein the first lock element includes a locking surface having one or more engagement features formed thereon, and further comprising a detent pin extending radially outwardly relative to the rotational axis, the detent pin biased against the locking surface and interfering with at least one of the one or more engagement features to produce a tactile feel when the adjustment knob is rotated about the rotational axis.

16. The adjustment apparatus of claim 1, further comprising one or more sealing members disposed between the adjustment knob and the adjustment mechanism.

17. A riflescope comprising:
an adjustment mechanism supported by the riflescope, the adjustment mechanism configured to adjust a setting of the riflescope;
an adjustment knob operatively coupled to the adjustment mechanism, wherein rotation of the adjustment knob about a rotational axis drives the adjustment mechanism and adjusts the setting of the riflescope; and
a lock mechanism including:
a first lock element fixed relative to the sighting device; and
a second lock element selectively movable relative to the first lock element, wherein the first and second lock elements engage one another in a locked position to restrain rotation of the adjustment knob about the rotational axis, and wherein the first and second lock elements are disengaged in an unlocked position to allow the adjustment knob to be rotated about the rotational axis.

18. The riflescope of claim 17, further comprising a lock-release mechanism operatively coupled to the lock mechanism, the lock-release mechanism manually actuatable to disengage the first and second lock elements from the locked position and allow the adjustment knob to be rotated about the rotational axis.

19. The riflescope of claim 18, further comprising a biasing member operatively coupled with the lock-release mechanism, wherein, when the adjustment knob is in the locked position, the biasing member exerts a force on the lock-release mechanism to maintain the adjustment knob in the locked position.

20. The riflescope of claim 17, wherein the second lock element is movable in a radial direction relative to the axis of rotation of the adjustment knob.

21. The adjustment apparatus of claim 1, wherein the second lock element is movable relative to the adjustment knob to disengage the first and second lock elements.

22. The riflescope of claim 17, wherein the second lock element is movable relative to the adjustment knob to disengage the first and second lock elements.

23. The adjustment apparatus of claim 2, wherein the lock release mechanism is movable relative to the adjustment knob to disengage the first and second lock elements.

24. The riflescope of claim 18, wherein the lock release mechanism is movable relative to the adjustment knob to disengage the first and second lock elements.

* * * * *

UNITED STATES PATENT AND TRADEMARK OFFICE
CERTIFICATE OF CORRECTION

PATENT NO.      : 9,665,120 B2
APPLICATION NO. : 15/076319
DATED           : May 30, 2017
INVENTOR(S)     : Bernard T. Windauer It is certified that error appears in the above-identified patent and that said Letters Patent is hereby corrected as shown below:

In the Specification

In Column 4, Line 25, please replace "an optical or power" with --an optical or a power--.

In Column 7, Line 42, please replace "FIGS. 6A 6D show" with --FIGS. 6A-6D show--.

In Column 8, Line 2, please replace "is in locked position" with --is in a locked position--.

In Column 9, Line 13, please replace "is in locked position" with --is in a locked position--.

In the Claims

In Column 11, Line 47, please replace "The adjustment apparatus of claim 6" with --The adjustment apparatus of claim 8--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*